United States Patent [19]

Wilson et al.

[11] 4,324,429
[45] Apr. 13, 1982

[54] QUICK DETACHABLE HINGING COVER FOR PICKUP TRUCK BEDS

[75] Inventors: Charles E. Wilson; Arnold W. Wilson; Reginald H. Morley, all of Calgary, Canada

[73] Assignee: Sunwil Manufacturing Ltd., Alberta, Canada

[21] Appl. No.: 136,269

[22] Filed: Apr. 1, 1980

[51] Int. Cl.³ .............................................. B60P 7/02
[52] U.S. Cl. ...................................... 296/100; 16/254
[58] Field of Search ................... 296/100, 10; 49/381; 16/171, 172, 174

[56] References Cited

U.S. PATENT DOCUMENTS

| | | | |
|---|---|---|---|
| 2,237,000 | 4/1941 | Gustaveson | 16/174 |
| 2,989,340 | 6/1961 | Penner | 296/100 |
| 3,060,492 | 10/1962 | Dellith | 16/172 |
| 3,256,805 | 6/1966 | Swanson | 16/171 |
| 3,536,352 | 10/1970 | Beckley | 296/10 |
| 3,704,039 | 11/1972 | Dean | 296/100 |
| 3,923,334 | 12/1975 | Key | |
| 4,124,247 | 11/1978 | Penner | 296/100 |

*Primary Examiner*—David M. Mitchell
*Assistant Examiner*—Ross Weaver
*Attorney, Agent, or Firm*—Gerald L. Moore

[57] ABSTRACT

A hinging structure for fixing a cover onto a pickup truck bed. Easy access to the bed is provided by the pivoting of one end of the cover upward away from the bed side walls. The structure includes an angle bracket fixed to a bed side wall and a cooperating latch member fixed to the cover and which interlocks to hold the cover onto the bed side walls while allowing one end of the cover to be pivoted upward for access to the bed. The latch includes a pivoted member that interfits with the angle bracket to hold the cover on the bed but which can be pivoted to a position to disengage the angle bracket for removal of the cover.

10 Claims, 6 Drawing Figures

QUICK DETACHABLE HINGING COVER FOR PICKUP TRUCK BEDS

BACKGROUND OF THE INVENTION

This invention is primarily used for attaching covers to pickup beds and especially flat covers which extend generally horizontally at the level of the top of the bed side walls. It is important that such covers be mounted in a manner to allow the raising of one end for access to the bed yet safeguard the contents of the bed when locked while being quickly and easily removed when not needed. In addition when the cover is removed it is preferable that any remaining hardware on the bed be as unobstructive as possible.

RELATED PATENTS

The present invention represents an improvement over the hinging structures described in U.S. Pat. No. 2,989,340, Quick Detachable Hinging Structure, dated June 20, 1961 and U.S. Pat. No. 4,124,247, Quick Detachable Hinging Structure, dated Nov. 7, 1978, both issued to Benjamin L. Penner.

SUMMARY OF THE INVENTION

A hinge structure primarily for fastening a cover to a pickup truck bed having upstanding side walls, end wall and tail gate. The hinge structure includes a pair of angle brackets and means for attaching one to each of the top surfaces of the side walls. Each bracket includes an upstanding member having a forward facing horizontal groove presenting a downward facing surface and a rearward facing recess. A latch is provided with means for attachment to the front edge of the cover and which interlocks with the angle bracket to provide a first flange fitting into the recess and a pivoting member fitting into the horizontal groove of the upstanding member. The pivoting member fits beneath the downward facing surface and is mounted to be pivoted out of engagement with the upstanding member when the cover is pivoted about the hinge structure to the raised position.

DESCRIPTION OF THE INVENTION

Figure 1:
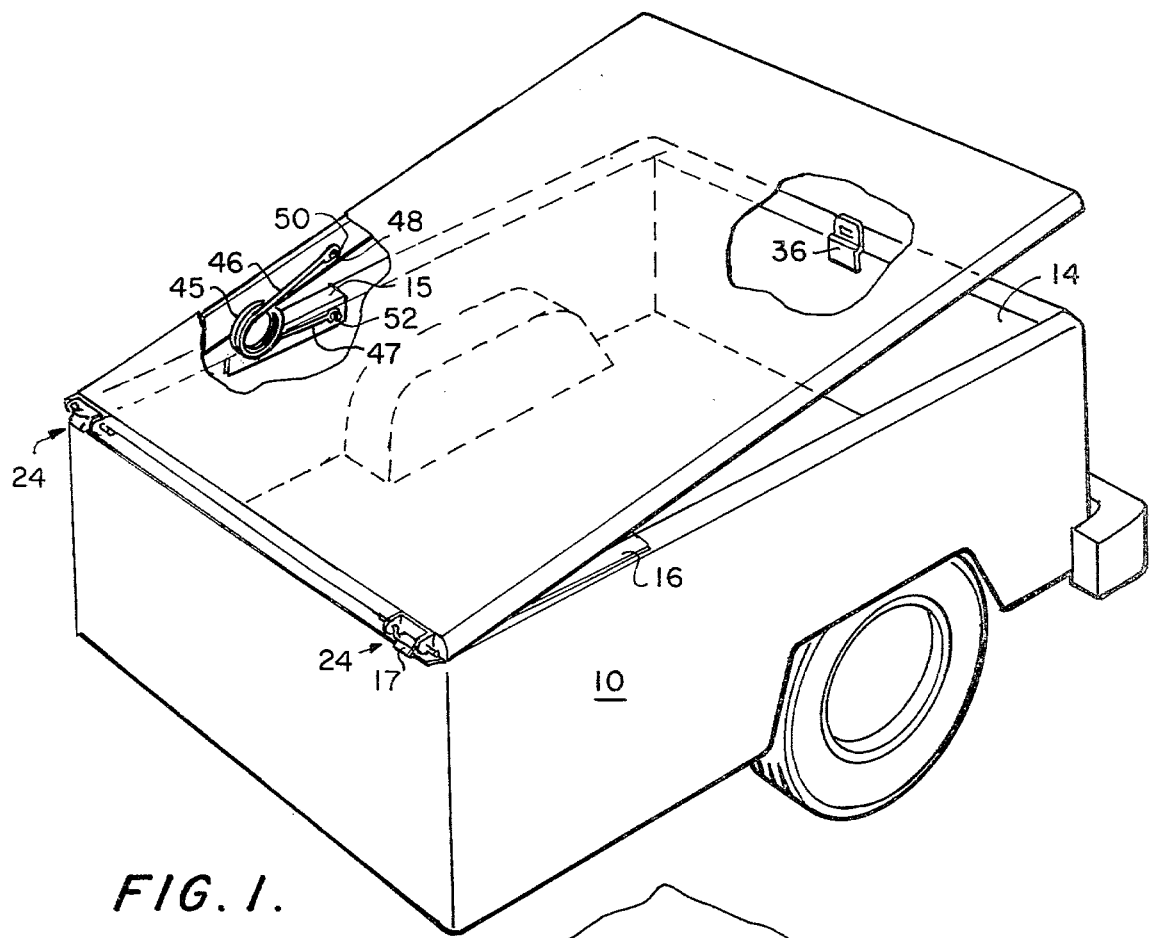
FIG. 1 is a perspective view showing a standard pickup truck bed with a cover attached by use of the subject invention and pivoted to a slightly raised position.
Figure 2:
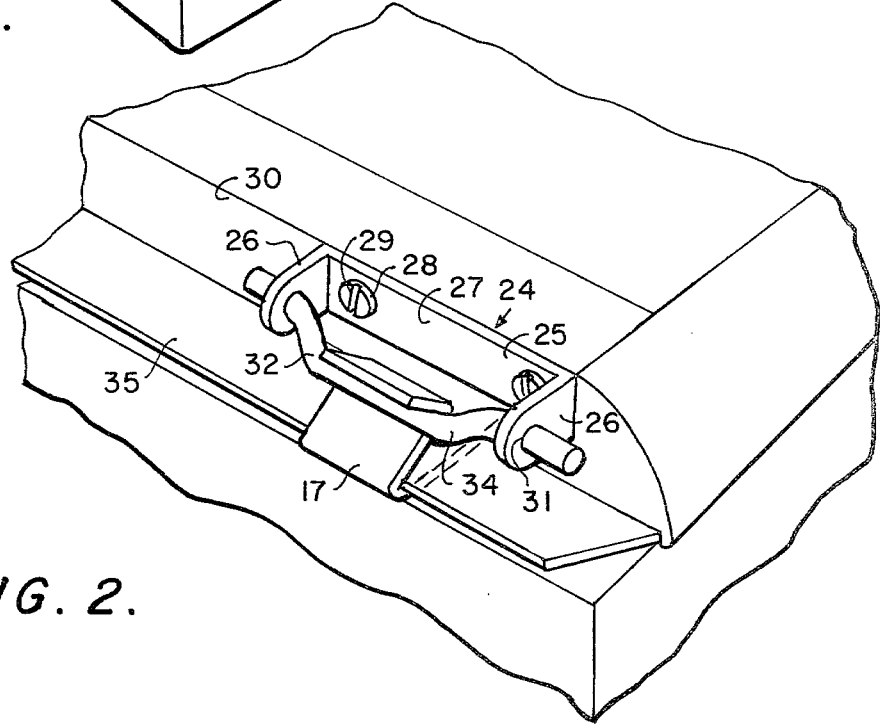
FIG. 2 is an enlarged perspective view of the hinge structure of the subject invention.

In FIG. 1 is shown a standard pickup truck bed 9 comprising side walls 10 and 11, a forward wall 12 and a tailgate or rear wall 14. The invention is embodied in a cover for said bed comprising a top 15 pivotally fixed at one edge to the side walls at one edge of the bed so as to be positioned horizontally in contact with the tops of the bed side walls. While the cover is described to cover a pickup truck bed it can also be used to cover a trailer or other similar vehicle.

Figure 3:
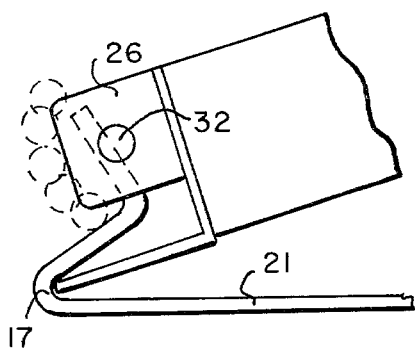
FIGS. 3 and 4 are side views along the line 3—3 of FIG. 2 with the cover partially shown in the raised and the closed positions, respectively.
Figure 4:
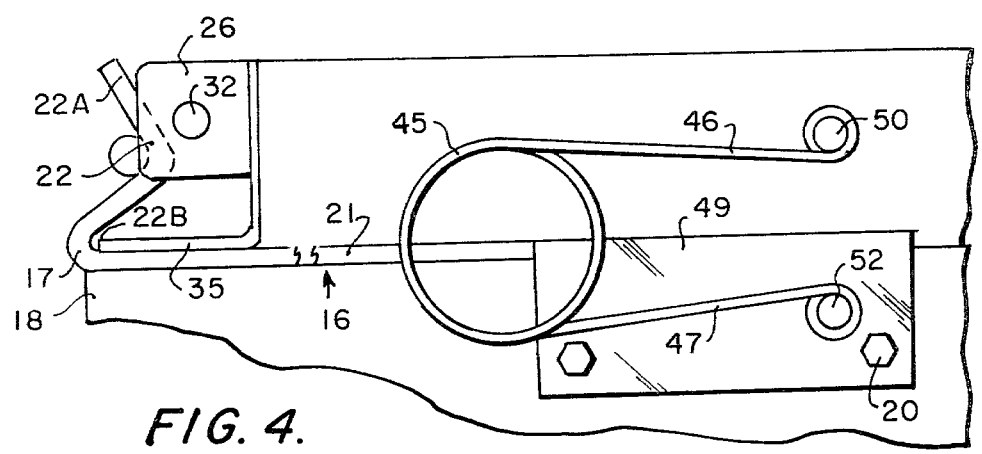

Shown primarily in FIGS. 3 and 4 is the hinge structure for attaching the edge of the cover to the bed walls. An angle bracket 16 is bolted to the top edge of each side wall preferably in a position such that the forward edge formed by an upstanding member 17 aligns with the forward surface 18 of the bed front wall and extends adjacent one selected edge of said top. Each bracket includes a flange 19 that extends downward along and is bolted to the inside surface of the side wall by bolts 20. A base flange 21 abuts the top surface of the side wall and is bent upward at the forward edge to form the upstanding member 17. The upstanding member 17 extends at approximately 45° over the base flange 21 to form a first recess 22B with the flange facing the top and is thereafter bent at right angles near the midpoint to form a forward facing second recess or groove 22 having a downward facing surface 22A facing away from said top.

Adjacent each forward corner of the top is a hinge latch 24 comprising a U-shaped support 25 formed by bending the ends 26 of a center flange 27 at right angles to the center portion. The center flange includes holes 28 through which are extended machine screws or bolts 29 for fastening the latch to the forward edge 30 of the top. The end flanges 26 each include a center opening 31 through which is extended a pivotable rod or member 32 which is bent to form an offset center portion 23. The offset center portion is positioned between the end flanges to prevent the rod from sliding lengthwise and falling or separating from the latch.

To fasten the top 15 onto the truck bed it is placed in position and slid forward until a forward flange 35 slides into the recess 22B and abuts the base of the upstanding member 17. Thereafter the opposite end of the top is pivoted upward approximately 30° to the position shown in FIG. 3 to permit the rod 32 to be pivoted over the top edge of the upstanding member 17 and into the forward facing groove 22 thereof. By now lowering the rear end of the cover, the rod is moved into the groove to engage the downward facing surface 22A and prevent the cover from moving rearward or upward while the forward flange 35 on the cover in fitting into the recess 22, prevents the cover from moving forward or upward thereby securely fastening the forward edge of the top to the bed front wall. Naturally for removing the cover, the cover must be pivoted upward and the rod member 32 pivoted out of the groove in the upstanding member 17.

Figure 5:
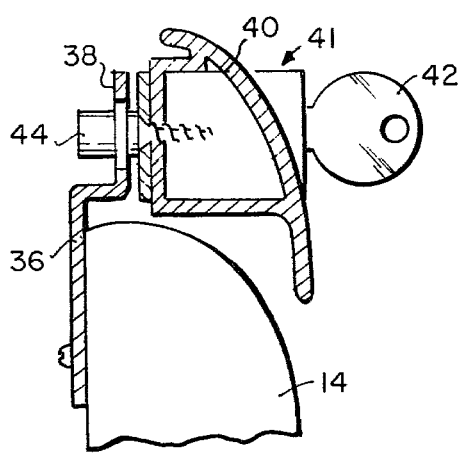
FIG. 5 is a cross-sectional view of a lock fixed to the rear of the cover.
Figure 6:
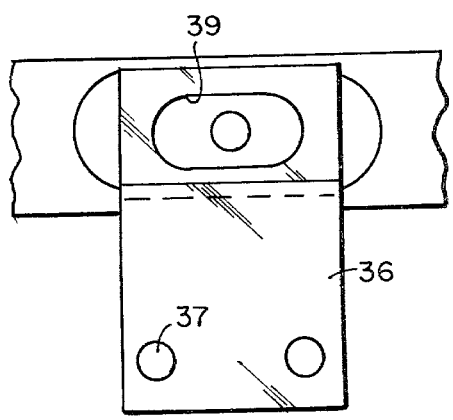
FIG. 6 is a side view of a tailgate hasp.

For locking the top in place so that it cannot be removed or the contents of the bed be reached, a tailgate hasp 36 is fixed to the inside surface of the tailgate 14 by screws 37 passing through holes in the hasp (FIGS. 5 and 6). The hasp extends upward above the top surface of the tailgate and includes an offset portion 38 which includes an elongated hole 39. Fixed in the rear extrusion 40 of the top is a locking assembly 41 which is actuated by a key 42. The locking assembly includes a bolt 44 which for locking is moved forward out of the assembly and through the opening 39 of the hasp. The locking assembly is of standard design and prevents the lid or cover from being pivoted or raised at the rear end. Thus with the forward edges of the top being held by the interlocking relationship of the bracket and latch assemblies, the lock prevents removal of the top since it cannot be raised for disengagement of the rod from the latch.

To hold the cover in either the closed or open position there is provided a pair of support springs 45 (FIG.

1) each having the extending ends 46 and 47 pivotally connected to the midpoint longitudinal edge of the top. The end 46 is fixed by machine screws 48 to a vertically extending cover bracket 49 mounted on an inside edge of the top 15. A bolt 50 extends through the cover bracket and through the end 46 of the spring which end is bent back on itself to form an eye.

The other end 47 of the coil spring is fixed to the flange 52 mounted on the inside surface of the adjacent bed side wall. A bolt 52 extends through the eye formed by bending the spring end 47 back on itself. These springs tend to hold the cover in either the open or closed position because of the tendency of the spring to remain in either of two positions. As shown in FIG. 1 the top can be pivoted upward to extend the spring which in turn will hold the cover in the raised or open position. On the other hand when the top is closed the spring is shifted to a position with the ends adjacent to maintain the cover in abutting relationship with the bed walls.

The invention claimed:

1. A cover for a pickup truck bed having upstanding side walls, a front wall and a rear wall, said cover comprising:
 a top of sufficient size to include edges resting on and overlapping the upstanding walls of the truck bed;
 a pair of angle brackets fixed to said upstanding side walls at spaced positions adjacent one selected edge of said top, said angle brackets each including an upstanding member extending adjacent said selected edge and forming a first recess facing said top and a second recess facing away from said top;
 a latch aligned with and cooperation with each angle bracket and fastened to said selected edge of said top to fasten said top to said upstanding side walls while allowing the top to be pivoted about said one selected edge to a raised and closed position, each latch including a flange fitting into said bracket first recess and also including a rod pivotally connected and movable to positions engaging and disengaging from said second recess to prevent movement of said top selected edge away from said latch while allowing the top to be pivoted about said latch; and
 means fixed to said top and side walls at a position remote to said angle brackets and flanges and operable to lock said top to said side walls and prevent pivoting of said top about said one selected edge.

2. A cover as defined in claim 1 wherein said rod can only be pivoted into and out of engagement with said second recess when said top is pivoted to the raised position.

3. A cover as defined in claim 2 including a spring fixed between said top and an upstanding side wall and operable to releasably hold the top in either the raised or closed position.

4. A cover as defined in claim 2 wherein each said angle bracket comprises a base flange fixed to a side wall and an upstanding member fixed to said base flange and extending at an acute angle to form the first recess between the upstanding member and said base flange.

5. A cover as defined in claim 4 wherein said upstanding member is bent at a point spaced from said base flange to form said second recess.

6. A cover as defined in claim 5 wherein said latch comprises an elongated planar member bent into a U-shape to form ends extending normal to a center portion with aligned holes in said ends to receive and hold said rod.

7. A cover is defined in claim 6 wherein said rod extends through said openings in said planar member ends.

8. A cover as defined in claim 7 wherein a center portion of said rod member is bent out of alignment with said ends to hold said rod member on said latch.

9. A cover for a pickup truck bed having upstanding side walls, a front wall and a rear wall, said cover comprising:
 a top of sufficient size to form edges overlapping said walls when the top is laid in a closed position on top of said walls;
 a pair of upstanding members fixed to selected walls adjacent a selected edge of said top and forming a second recess facing away from said top;
 a pivotable member fixed to said selected edge of said top adjacent each upstanding member;
 means interlocking said upstanding member and said top selected edge to prevent the lifting of said selected edge away from said selected walls while enabling said top to be pivoted to a raised position about said selected edge; and
 each said pivotable member having a portion pivotal into said adjacent second recess of said upstanding member and pivotable out of said second recess only when the top is in the raised position to prevent movement of the top away from said upstanding member except when raised.

10. A cover as defined in claim 9 including locking means for releasably holding said top in the closed position.

* * * * *